United States Patent [19]

Falbierski

[11] Patent Number: 4,836,340
[45] Date of Patent: Jun. 6, 1989

[54] ANTI-BACKLASH DEVICE FOR A PUMP SHAFT

[75] Inventor: Jean-Jacques Falbierski, Jeumont, France

[73] Assignee: Jeumont-Schneider Corporation, Puteaux Cedex, France

[21] Appl. No.: 599,218

[22] Filed: Apr. 13, 1984

Related U.S. Application Data

[63] Continuation of Ser. No. 318,592, filed as PCT FR81/00060 on May 5, 1981, abandoned.

[30] Foreign Application Priority Data

May 6, 1980 [FR] France ............................... 80 10032

[51] Int. Cl.$^4$ ............................................. F16D 63/00
[52] U.S. Cl. ................................. 188/82.34; 188/82.7; 188/82.8; 192/45.1
[58] Field of Search .................... 188/82.3, 82.34, 82.4, 188/82.8, 82.84, 82.7; 192/45.1, 45.2; 415/123, 122 R; 417/223, 319; 418/69; 137/527, 527.8

[56] References Cited

U.S. PATENT DOCUMENTS 1,878,333  9/1932  Scott .................................. 188/82.3
2,010,885  8/1935  Osterholm ...................... 92/45.1 X
2,215,548  9/1940  Duffield ........................... 188/82.4
2,447,384  8/1948  Wolff .............................. 192/45.1 X

FOREIGN PATENT DOCUMENTS 1446255  6/1966  France ................................ 188/82.4
 394221  6/1933  United Kingdom ............... 137/527
 951010  3/1964  United Kingdom ............... 188/82.3

Primary Examiner—George E. A. Halvosa
Attorney, Agent, or Firm—Rines and Rines, Shapiro and Shapiro

[57] ABSTRACT

The present invention is concerned with an anti-backlash device for a pump shaft comprising an asymmetrical idler (3) pivoting around a fixed axis (4) and an elastic device (5) which produces a restoring force that tends to press the idler (3) against the surface of the pump shaft (1). The anti-backlash device further embodies at least one fin (7) firmly attached to the idler (3) and preferably arranged nearly perpendicular to the direction of flow of the pumped fluid, so that the motion of the fluid will produce a force which, when applied to the fin, yields a moment with respect to the idler axis slightly greater than that produced by the restorative force applied in the opposite sense.

3 Claims, 1 Drawing Sheet

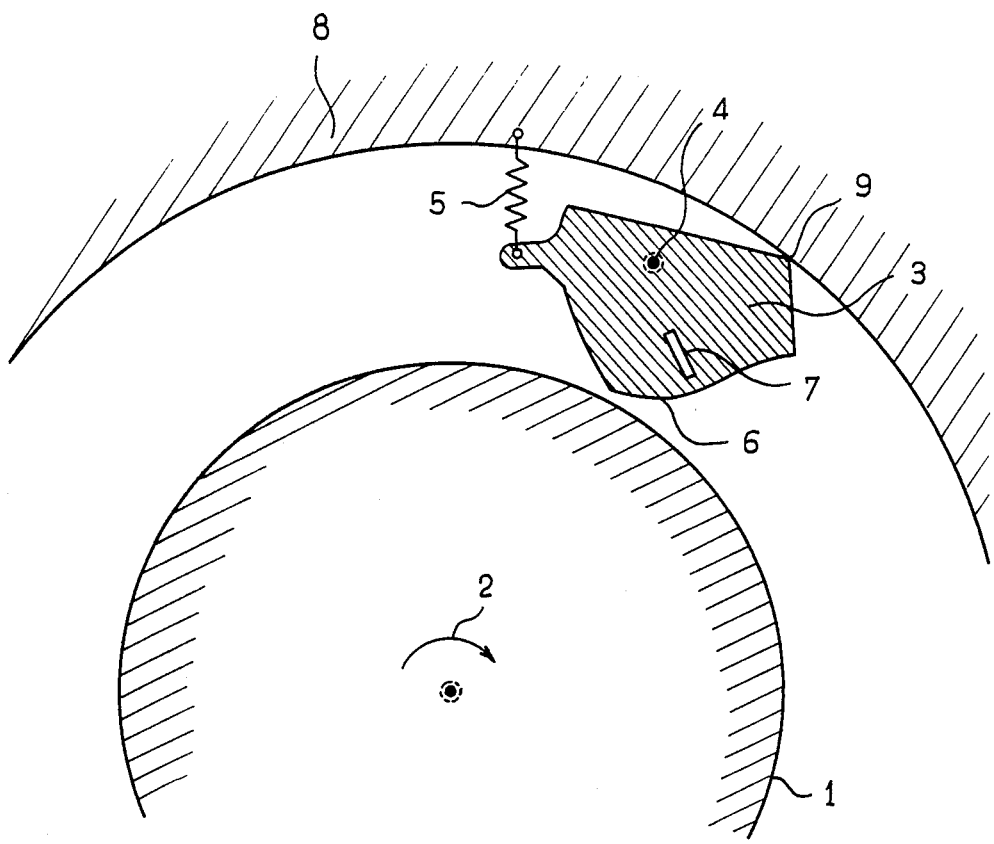

ANTI-BACKLASH DEVICE FOR A PUMP SHAFT

This is a continuation application of U.S. Ser. No. 318,592, filed as PCT FR81/00060 on May 5, 1981, now abandoned.

The present invention relates to anti-backlash devices for pump shafts such as those employed in nuclear and other related fluid pumping systems.

As is generally known, anti-backlash devices of this type employ an asymmetrical idler pivoting around a fixed axis in the pumped fluid flow region with a resilient device employed to produce a force that tends to press the idler against the surface of the pump shaft. A restorative force is thereby generated establishing a support reaction between the fixed axis and the center of the shaft in such a way that if the shaft begins to rotate in the reverse direction there is, first, a considerable braking effect, and, second, pressing of the idler against the shaft. In normal rotation, the slight friction caused by the rubbing of the idler against the surface of the shaft remains. Unfortunately, such forces cause wear of the component parts.

An object of the present invention, accordingly, is to eliminate such wear and related drawbacks by providing a new and improved anti-backlash device wherein the idler is maintained free of the shaft during normal rotation of the pump.

Other and further objects will be explained hereinafter and are more particularly delineated in the appended claims.

According to the invention, the anti-backlash device includes at least one fin firmly attached to the idler and arranged nearly perpendicular to the direction of flow of the pumped fluid, so that the motion of the fluid will produce a force which, when applied to the fin, yields a moment with respect to the idler axis slightly greater than that produced by the restorative force applied in the opposite sense.

As a result, during normal rotation of the pump shaft the idler is completely free of the shaft, thereby eliminating all friction between the parts; whereas in stopping or backlash, the idler presses against the surface of the shaft and serves as the anti-backlash device.

In summary, from one of its important aspects, the invention embraces an anti-backlash device for a pump shaft having, in combination, asymmetrical idler means rotatable about a fixed axis within the region of pumped fluid flow along the pump shaft, resilient means producing a restoring force tending to press the idler means against the pump shaft, and fin means secured to the idler means and extending into the path of said fluid flow and adjusted to cause the fluid flow to produce a force upon the fin means sufficient to generate a moment with respect to said axis of the idler means that slightly exceeds that generated in the opposite direction by the said restoring force. A preferred and best mode embodiment and other details are hereinafter set forth.

The invention will be understood more clearly, and other purposes, advantages and characteristics of the same will be made more apparent by reference to the accompanying drawing, the single FIGURE of which is a transverse sectional view of a preferred construction which is illustrative of, though not restrictive of, apparatus for carrying out the underlying concept of the invention.

Referring to the drawing, the pump shaft 1 is assumed to have the normal direction of rotation indicated by arrow 2. A centrifugal motion is impressed upon the pumped fluid in the region there-about.

The anti-backlash device of the invention includes an asymmetrical idler 3 pivoting around a fixed axis 4 disposed in said region. An elastic or resilient device 5, such as a restoring spring, is provided in order to generate a restorative force that tends to press part 6 of the idler against the surface of the shaft 1.

In addition, in accordance with the invention, a fin 7 (or a plurality, not shown) is firmly attached to idler 3 and is arranged preferably nearly perpendicular to the direction of flow of the pumped fluid in such a way that the fluid applies an appropriate force to the fin as now specified.

The precise location of fin 7 is determined by the useful surface area and the rate of flow of the pumped fluid and is so adjusted and contrived that the torque moment applied to it with respect to fixed axis 4 is caused to be slightly greater than the restorative force with respect to the same axis, which acts in the opposite direction.

In normal operation of the pump, the shaft 1 turns in the direction indicated by arrow 2. The fluid exerts an appropriate force on the fin 7 to cause the idler to come to rest, at region 9, against the fixed support 8. As a result, no friction force is generated by the idler 3 on the surface of the shaft 1, in consequence of which there is no wear of the parts.

During abnormal operation, i.e., in case of back-lash, the fluid exerts no force against the fin 7, and the idler 3 rubs against the surface of the shaft and then presses against or pinches the shaft itself, as in normal anti-backlash devices.

In addition, if the pump is stopped, the idler 3 works to prevent any sudden movement of shaft 1.

Clearly further modifications including different shapes and positioning of the fin(s) will occur to those skilled in this art, and such are considered to fall within the spirit and scope of the invention as defined in the appended claims.

I claim:

1. In a pump having a fixed member, a pump shaft disposed within and spaced from the fixed member, and rotatable in a predetermined direction relative to the fixed member to cause fluid to flow in the space between the fixed member and the pump shaft, an anti-backlash device having, in combination, asymmetrical idler means pivotable about a fixed axis within said space, resilient means producing a restoring force tending to press the idler means against the pump shaft, and fin means secured to the idler means and extending into the path of said fluid flow and adjusted to cause the fluid flow to produce a force upon the fin means sufficient to generate a moment with respect to said axis of the idler means that slightly exceeds that generated in the opposite direction by the said restoring force, said moment being sufficient to maintain the idler means away from the pump shaft and thus to prevent friction between the pump shaft and the idler means, the restoring force of the resilient means pressing the idler means against the pump shaft, in the absence of said moment, in order to brake the pump shaft.

2. Anti-backlash device as claimed in claim 1 and in which said fin means is oriented nearly perpendicular to the direction of flow of the pumped fluid.

3. Anti-backlash device as claimed in claim 2, wherein said fin means is located on said idler means at a position between said fixed axis and said pump shaft and wherein said moment turns said idler means into engagement with said fixed member.

* * * * *